United States Patent Office 2,801,327
Patented July 30, 1957

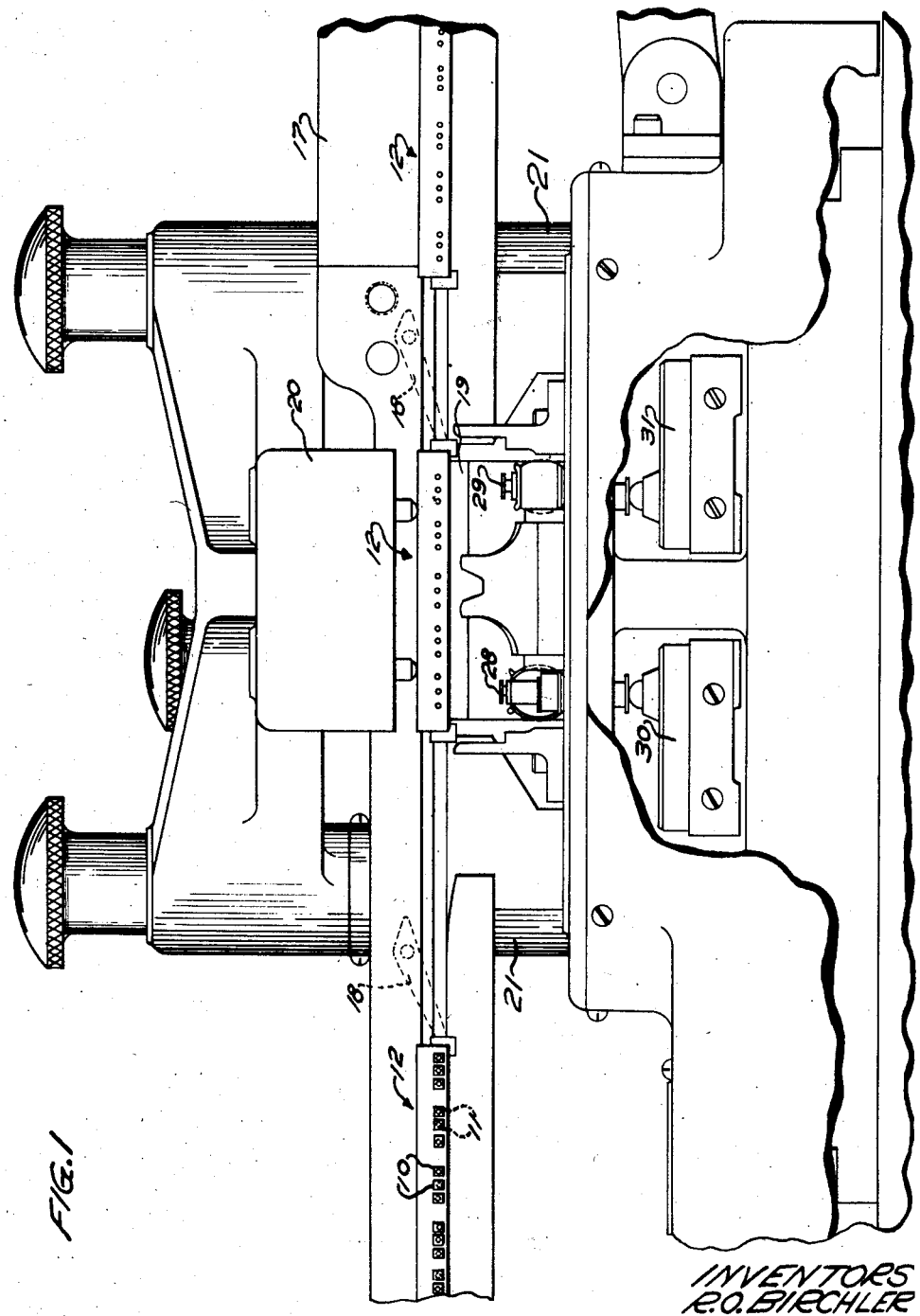

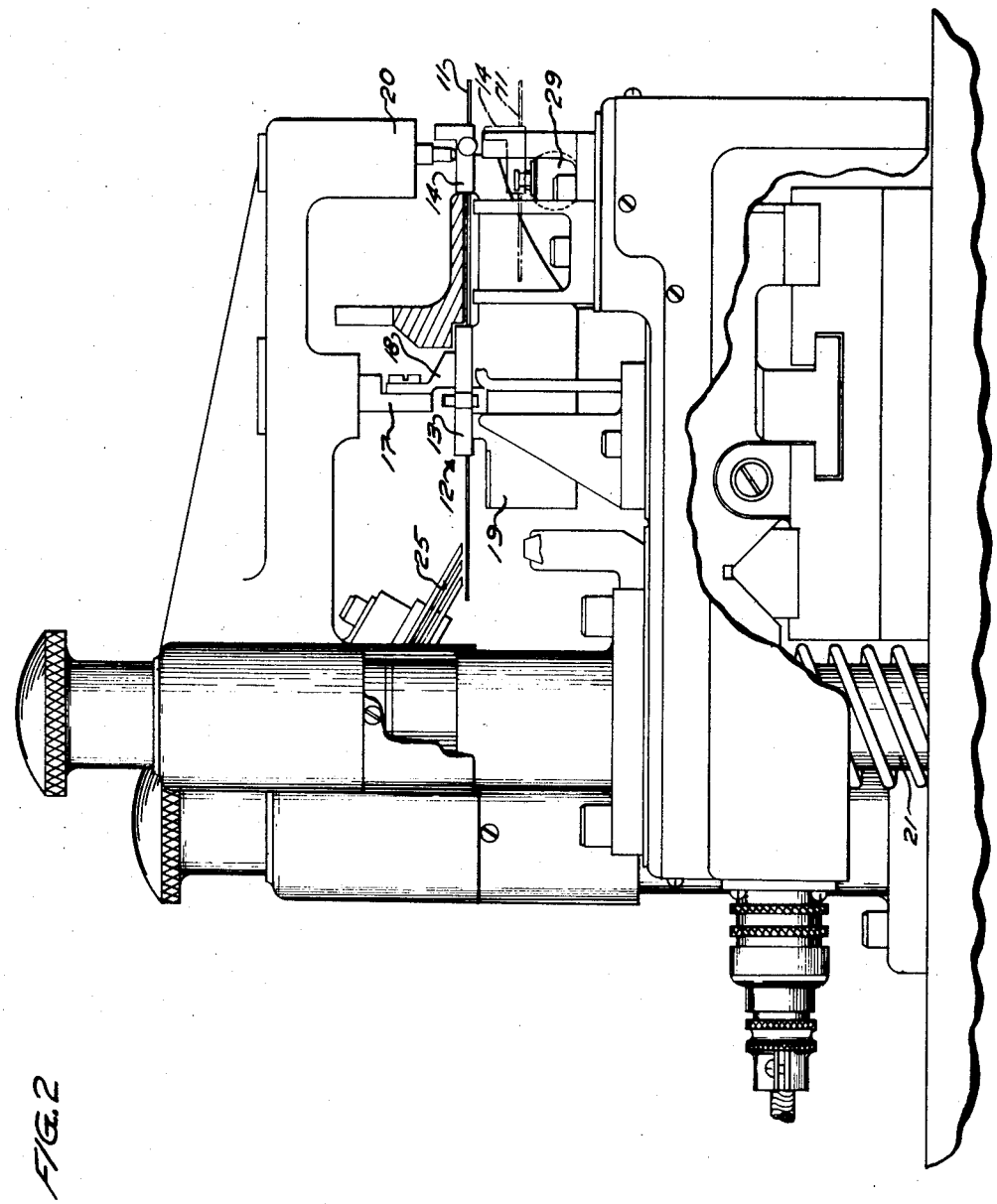

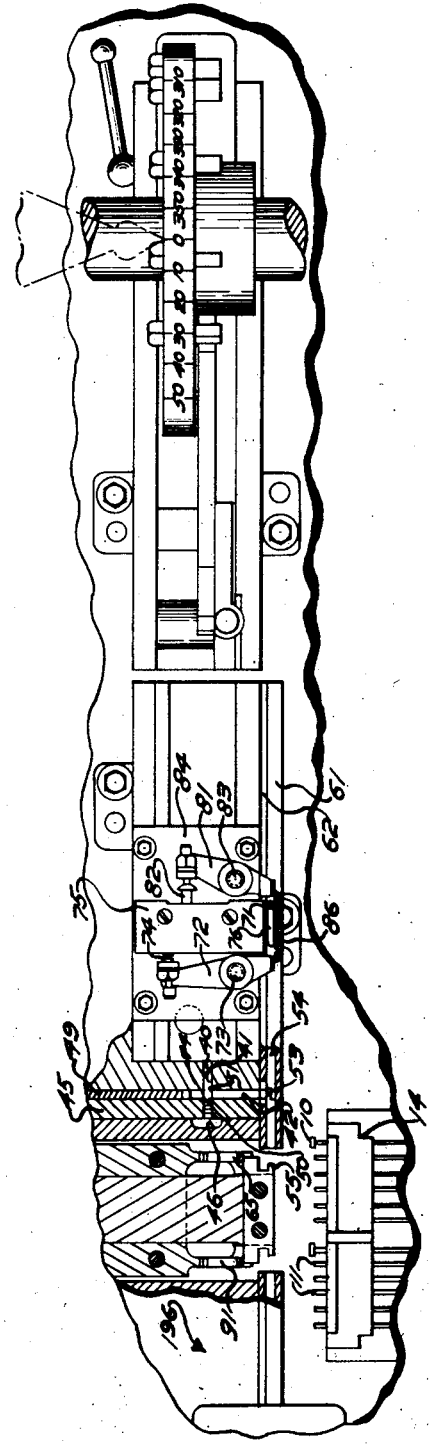

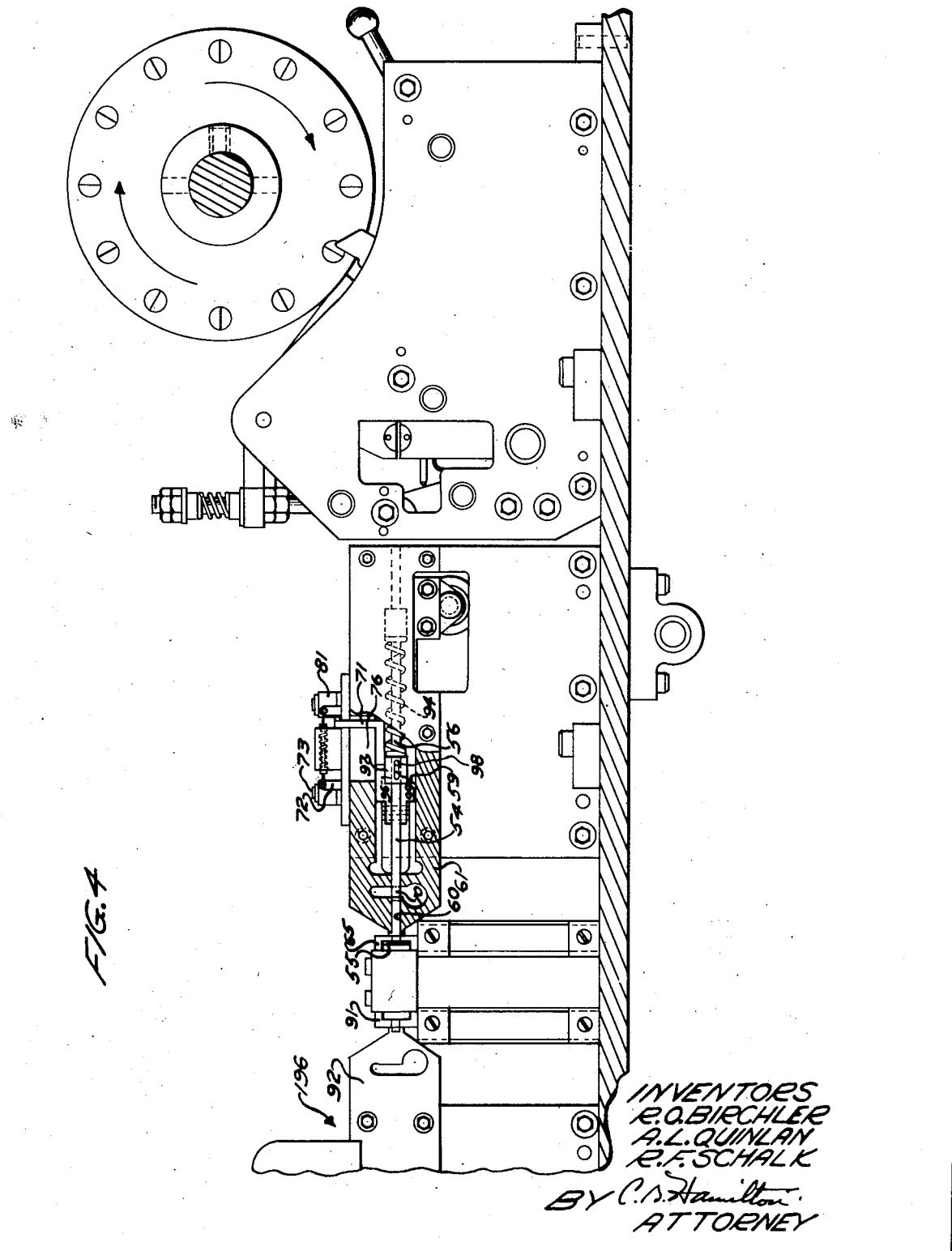

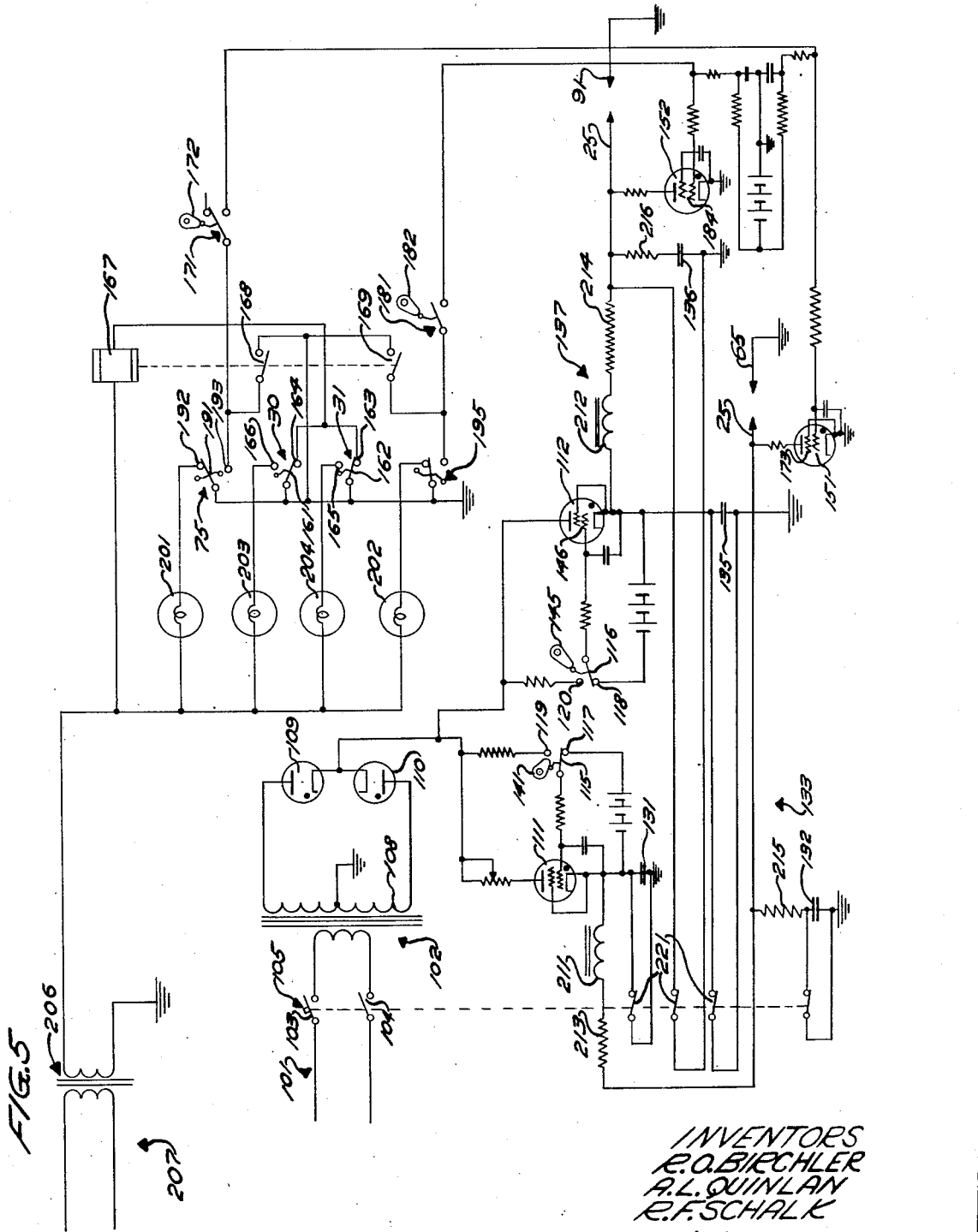

2,801,327
WELDING APPARATUS

Robert O. Birchler, Cicero, Amos L. Quinlan, La Grange Park, and Robert F. Schalk, Chicago, Ill., assignors to Western Electric Company, Incorporated, New York, N. Y., a corporation of New York Application January 31, 1955, Serial No. 485,162

8 Claims. (Cl. 219—78)

This invention relates to welding apparatus, and more particularly to percussion welding apparatus. An object of the invention is to provide new and improved welding apparatus in which parts to be welded together are fed to precise positions relative to one another.

Another object of the invention is to provide welding apparatus in which the welding apparatus is made inoperative if one of the parts to be welded together is not of proper size.

Another object of the invention is to provide welding apparatus in which parts to be welded together must be precisely located before the apparatus can operate.

A welding apparatus illustrating certain features of the invention may include means for advancing articles such as wire spring relay combs, for example, step-by-step to a welding position and for moving the article at the welding position laterally of its step-by-step feeding direction into alignment with a pair of welding parts reciprocable theretoward. Electrode jaws receive parts to be welded to the articles, which parts are sheared to a predetermined configuration and are fed to the jaws by a reciprocable feed, which, if a part being fed thereby to the jaws is not of proper configuration, disables the welding apparatus so that defective parts are prevented. Also, if the articles are not in proper welding position, the welding apparatus is disabled.

A complete understanding of the invention may be obtained from the following detailed description of an apparatus forming a specific embodiment thereof, when read in conjunction with the appended drawings, in which Fig. 1 is a front elevation of the welding apparatus forming one embodiment of the invention;

Fig. 2 is a side elevation of the apparatus shown in Fig. 1;

Fig. 3 is a fragmentary top plan view of the apparatus shown in Fig. 1;

Fig. 4 is a vertical section of a portion of the apparatus shown in Fig. 3, and

Fig. 5 is a diagrammatic view of a control and welding circuit of the apparatus shown in Fig. 1.

Referring now in detail to the drawings, there is shown therein an apparatus for welding contacts 10 (Figs. 2, 3 and 4) to wires 11 of a wire spring relay comb 12 which includes molded blocks 13 and 14. The combs 12 are advanced step-by-step to the left, as viewed in Fig. 1, by a reciprocable feed bar 17 having pawls 18. The combs 12 are fed by the feed bar 17 step-by-step to a depressible welding nest 19, and when each comb is fed to the nest 19, a presser 20 is pulled downwardly by rods 21 to press the comb 12 on the nest 19 downwardly to a welding position for the comb 12. After the presser 20 is moved downwardly, a brush 25 contacts the wires 11 electrically and applies a voltage to the lefthand ends of the wires, as viewed in Fig. 2.

As the combs 12 reach their lower or welding positions, the block 14, if the comb 12 is properly positioned, engages plungers 28 and 29 of limit switches 30 and 31, respectively, and actuates the limit switches 30 and 31. If the comb 12 on the nest 19 is not properly positioned for welding, one of the plungers 28 and 29 is not depressed by the comb and the welding operation on the wires 11 is prevented. Certain features of the structure disclosed herein are disclosed and claimed in copending application Serial No. 347,335, filed April 7, 1953, now Patent No. 2,749,419, issued July 5, 1956, by E. W. Larsen for "Machine for Welding Contacts Onto Switch Parts."

A tape 40 (Fig. 3) is advanced along a guideway 41 across a channel 42 so that the lefthand end of the tape 40 projects into a slot 44 in a block 45 also having scrap chute 46. After the tape 40 is fed to this position, a shear bar 49 movable along the channel 42 is actuated to shear the tape 40 in cooperation with shearing edges 50 and 51, and moves the resulting contact sheared from the tape 40 through the channel 42 into a notch 53 formed in a feed slide or bar 54 which is reciprocable toward and away from a fixed contact locating bar 55 by a slide 56. The slide 56 and the feed bar 54 are reciprocated along guideways 59 and 60 formed in plates 61 and 62, and, whenever the feed bar 54 is moved to the left by the slide 56, it moves the contact through the guideway 60 against the locating bar 55 to and into a pair of welding jaws 65, which are centered with respect to the contact. This loads the jaws 65, which carry the contact to the wire 11 aligned therewith.

If the contact is of sufficient length to form a good contact for the comb, a pin 71 carried with the slide 56 does not move against a lever 72, and the lever 72, which is mounted on a fixed pin 73, does not actuate a plunger 74 of a settable and resettable limit switch 75. However, if the contact being moved against the bar 55 is not of proper size, the pin 71, which moves in a slot 76, is moved far enough to actuate the lever 72. That is, the feed bar 54 is resiliently urged to the left as it feeds the contact to the stop 55 and the furthermost lefthand position is determined by the length of the contact cut from the tape 40. On the return stroke of the slide 56 and the feed bar 54 to the right, as viewed in Figs. 3 and 4, the pin 71 moves along the slot 76 and engages a resetting bell crank lever 81 and pivots the lever 81 in a counterclockwise direction, as viewed in Fig. 3, to actuate a resetting plunger 82 of the switch 75. The lever 81 is pivotally mounted on a pin 83 which is fixed to a plate 84 which also mounts the switch 75 and the pin 73, the plate being fixed to the guideway 60. A tension spring 86 is secured to the lower ends of the levers 72 and 81, as viewed in Fig. 3, and biases the levers to non-actuating positions.

Contacts are fed similarly to welding jaws 91 by apparatus including a guide 92 identical with but reversed with respect to the contact cutting and feeding apparatus just described. After the contacts have been fed to the jaws 65 and 91, the jaws are actuated by suitable means (not shown) disclosed in said above-mentioned application to carry the contacts to aligned ones of the wires 11, and, as the contacts approach the wires and just before contact therebetween, a potential difference applied between the jaws 65 and 91 and the wires causes an arc to be struck between the contacts and the ends of the wires, and the contacts are percussively welded to the ends of the wires.

The slide 56 includes a compression spring 94, which permits the bar 54 to remain stationary while the slide 56 continues to move to the left, as viewed in Fig. 4, when the contact 10 abuts the stop 55. The pin 71 is rigidly fastened to the bar 54, and, thus, its travel or length of movement to the left is determined by the length of the contact 10 being fed to the stop 55. Hence, if the contact is sufficiently long, the pin 71 does not move the lever 72 far enough to actuate the switch 75, but, if the contact 10 is too short, the pin 71 moves the lever 72 to actuate the switch 75. The slide 56 projects into a bore 96 in a head 97 of the bar 54. A pin 98 fixed to the slide 56 projects into a slot 99 in the head 97 to connect the slide 56 to the feed bar 54. The drive of the slide 56 is disclosed in the above-identified copending application.

The welding and control circuits for the jaws 65 and 91 and the brush electrode 25 are shown in Fig. 5 and include a power line 101 which supplies alternating current through a transformer 102 when contacts 103 and 104 of a toggle switch 105 are closed. The transformer has a center-tapped secondary winding 108 for supplying power to rectifying tubes 109 and 110, which serve to effect full wave rectification, the output of which is connected to charging control tubes 111 and 112. When cam-actuated contactors 115 and 116 are moved from contacts 117 and 118 to contacts 119 and 120, the tubes 111 and 112 are made conductive and charge capacitors 131 and 132 of a welding circuit 133 including the tube 111, and also charge capacitors 135 and 136 of a welding circuit 137 for the jaws 91, which also includes the tube 112 and the cam actuated contactor 116. After the capacitors 131 and 132 have been charged to a predetermined extent, a cam 141 synchronized with the operation of the jaws 65 moves the contactor 115 out of engagement with the contact 119 and into engagement with the contact 117 to stop charging of the capacitors 131 and 132. Similarly, when a predetermined charge has been placed on the capacitors 135 and 136, a cam 145 synchronized with the operation of the jaws 91 moves the contactor 116 from the contact 120 to the contact 118 to apply a negative bias to the grid 146 of the tube 112 to stop flow of current through the tube 112.

Gas-filled tubes 151 and 152 connected to brushes 25 and ground prevent damage to the jaws 65 and 91, which are driven by means disclosed in said above-mentioned application, and prevent welding of imperfect contacts 10 to the wires 11 if the comb 12 is in a misplaced position on the nest 19, a contact 10 is not of sufficient length or size or a contact is not fed to the bar 54. If the comb 12 should be misplaced or cocked on the nest 19 so that an imperfect weld would be formed or damage to the welding apparatus would occur, the block 14 of the comb 12, as it is moved down to its welding position, does not actuate both plungers 28 and 29 of the switches 30 and 31 and does not move contactors 161 and 162 from the contacts 163 and 164 and to the contacts 165 and 166. If either of the switches 30 and 31 is not actuated, a relay winding 167 is energized to close contacts 168 and 169 thereof, and then, just before the jaws 65 move the contact 10 held thereby toward the wire 11, a cam-operated switch 171 is closed by a cam 172 operable in synchronism with the movement of the drive for the jaws 65. When the switch 171 is closed, it removed negative bias from a triggering grid 173 of the tube 151 to fire the tube 151 to discharge the capacitors 131 and 132 so that no potential is placed across the brush 25 and jaws 65 when the jaws 65 later move the contact 10 to the wire 11 contacted by the brush 25. Similarly, before the jaws 91 move the contact 10 carried thereby toward the wire 11 aligned therewith, a cam-operated switch 181 is closed by a cam 182 driven in synchronism with the drive for the jaws 91 to ground a triggering grid 184 of the tube 152 and fire the tube 152. This discharges the capacitors 135 and 136 so that there is no potential difference between the brush 25 and the jaws 91, and, when the jaws 91 move the contact 10 carried thereby to the wire 11, no welding occurs.

As the slide 54 (Figs. 3 and 4) actuates the lever 72 to move and set a contactor 191 (Fig. 5) of the switch 75 out of engagement with the contact 192 and into engagement with a contact 193 of the switch 75 when the contact 10 being moved against the stop 55 is shorter than desired, the contactor 191 stays in this position. Then, when the cam 172 later closes the switch 171 occurring prior to return of the slide 54 to its retracted position, the grid 173 of the tube 151 is grounded to fire the tube 151 and discharge the capacitors 131 and 132. After the cam 172 has closed the switch 171, the slide 54 is retracted and actuates the lever 81 to reset the switch 75.

A resettable limit switch 195 identical with the switch 75 is provided for the contact feeding device for the jaws 91 and works in a similar manner with the switch 181 to fire the tube 152 if a contact 10 too short is fed to the jaws 91 by a feeding device 196 identical with the slide 54 and its associated elements but reversed with respect thereto in direction of feed. Thus, if the comb is properly positioned on the nest 19, both the contactors 161 and 162 are moved away from the contacts 164 and 163 so that switches 30 and 31 will not fire either of the tubes 151 and 152, and for each feed of a short contact 10 to the jaws 65 and 91, the tubes 151 and 152 will be fired by the switches 171 and 181 in series with the switches 75 and 195. Indicator lamps 201, 202, 203 and 204 are provided for indicating that the contacts fed to the jaws 65 and 91 are sufficiently long and that the comb is properly positioned and are supplied with power by a transformer 206 connected to a power line 207. The welding circuits 133 and 137 include choke coils 211 and 212 and resistors 213 and 214 which form discharge networks with the capacitors 131, 132, 135 and 136 to give predetermined discharge currents to the welding circuits. Certain features of the welding circuits are disclosed and claimed in copending application Serial No. 425,288, filed April 23, 1954, by E. E. Summers for "Welding Circuit."

The switch 105 is provided with contacts 221, which are closed when the contacts 103 and 104 are opened, to discharge the capacitors 131, 132, 135 and 136 whenever the switch 105 is actuated to shut off power to the welding circuits. It will be understood that the cycles of the circuits 133 and 137 may be out of phase with one another to any desired degree, or, if preferable, may be completely in phase with one another.

The above-described apparatus serves to insure that each comb fed thereto is properly positioned in the nest, is properly lowered into welding position before welding occurs, and it also insures that cut backs supplied to the jaws 65 and 91 are absent or less than a minimum desired length. The structure for effecting these results is simple, rugged and inexpensive.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A welding apparatus, which comprises means for holding a wire, electrode means for holding a block in alignment with the wire, means for feeding a block edgewise to the electrode means, means for applying a welding potential across the wire and the electrode means, and means responsive to the length of the block for disabling the potential applying means.

2. A percussion welding apparatus, which comprises an elongated welding electrode having a pair of jaws reciprocable longitudinally for holding a contact, a second electrode for holding a wire to which the contact is to be welded, a fixed stop positioned at one side of the jaws, a pusher for moving the contact to a position in front of the jaws and against the stop, resilient means for reciprocating the pusher, whereby the throw of the pusher is determined by the size of the contact, means for applying potential of the electrodes, and limit switch means operable by throw of the pusher when the contact is less than a predetermined size for disabling the potential-applying means.

3. A percussion welding apparatus, which comprises an elongated welding electrode having a pair of jaws reciprocable longitudinally for holding a contact, a second electrode for holding a wire to which the contact is to be welded, a fixed stop positioned at one side of the jaws for locating the contact in alignment with the wire, a guideway on the other side of the jaws, a pusher reciprocable along the guideway for moving the contact to a position in front of the jaws and against the stop, resilient means for reciprocating the pusher, whereby the throw of the pusher is determined by the size of the contact, means for applying potential to the electrodes, and limit switch means operable by throw of the pusher when the contact is less than a predetermined size for disabling the potential-applying means.

4. A percussion welding apparatus, which comprises an elongated welding electrode having a pair of jaws reciprocable longitudinally for holding a contact, a second electrode for holding a wire to which the contact is to be welded, a fixed stop positioned at one side of the jaws, a pusher for moving the contact to a position in front of the jaws and against the stop, resilient means for reciprocating the pusher, whereby the throw of the pusher is determined by the size of the contact, means for applying potential to the electrodes, a resettable limit switch, means operable by throw of the pusher when the contact is less than a predetermined size for setting the limit switch to disable the potential-applying means, means operable by movement of the pusher away from the stop for resetting the potential-applying means, and means for moving the first electrode to a welding position prior to operation of the resetting means.

5. A percussion welding apparatus, which comprises a depressible nest for holding a wire spring relay comb, means for depressing the nest and a comb thereon to a welding position, an electrode movable from a retracted position along a predetermined path toward a wire of the comb to carry a contact to the wire, a stop positioned at one side of the path, a guideway aligned with the stop and positioned on the other side of the path, a pusher movable along the guideway for pushing a contact along the guideway to a position in the path and against the stop, resilient means for moving the pusher, capacitive means for applying potential across the electrode and the wire so that the contact and the wire are percussively welded as the contact is moved to the wire by the electrode, a gas-filled tube triggerable to shunt the current from the capacitive means from the electrode, a resettable limit switch for triggering the tube to discharge the capacitive means, a pin carried by the pusher, a lever movable by the pin when a contact below a predetermined size is moved against the stop for actuating the switch to trigger the tube, a lever actuatable by the pin when the pusher is retracted for resetting the limit switch, and means for moving the electrode toward the wire after a contact has been moved by the pusher against the stop.

6. A percussion welding apparatus, which comprises a stop, a pusher for moving the contact to a position against the stop, an elongated welding electrode having a pair of jaws reciprocable longitudinally for grasping and carrying the contact, a second electrode for holding in alignment with the electrode a wire to which the contact is to be welded, a fixed stop positioned at one side of the jaws, resilient means for pushing the pusher toward the stop and retracting the pusher, whereby the throw of the pusher is determined by the size of the contact, means for applying potential to the electrodes, and limit switch means operable by greater throw of the pusher when the contact is less than a predetermined size for disabling the potential-applying means.

7. A percussion welding apparatus, which comprises means for holding a wire spring relay comb, a stop, a guideway aligned with the stop, a pusher movable along the guideway for pushing a contact along the guideway to a position against the stop, an electrode movable from a retracted position along a predetermined path toward a wire of the comb to carry the contact from the stop to the wire, resilient means for moving the pusher, capacitive means for applying potential to the electrode and the wire so that the contact and the wire are percussively welded as the contact is moved to the wire by the electrode, a gas-filled tube triggerable to shunt from the electrode current from the capacitive means, a resettable limit switch for triggering the tube, an actuator carried by the pusher, a lever movable by the actuator when a contact below a predetermined size is moved against the stop for actuating the switch to trigger the tube, a lever actuatable by the actuator when the pusher is retracted for resetting the limit switch, and means for moving the electrode toward the wire after a contact has been moved by the pusher against the stop.

8. A percussion welding apparatus, which comprises a depressible nest for holding a wire spring relay comb, means for depressing the nest and a comb thereon to a welding position, an electrode movable from a retracted position along a predetermined path toward a wire of the comb to carry a contact to the wire, a stop positioned at one side of the path, a guideway aligned with the stop and positioned on the other side of the path, a pusher movable along the guideway for pushing the contact along the guideway to a position in the path and against the stop, resilient means for moving the pusher, capacitive means for applying potential to the electrode and the wire so that the contact and the wire are percussively welded as the contact is moved to the wire by the electrode, a gas-filled tube triggerable to shunt the current from the capacitive means from the electrode, a limit switch for triggering the tube, means carried by the pusher for actuating the switch when a contact below a predetermined size is moved against the stop to trigger the tube, means for moving the electrode toward the wire after a contact has been moved by the pusher against the stop, and limit switch means operable by a comb improperly positioned on the nest for triggering the tube.

References Cited in the file of this patent

UNITED STATES PATENTS 2,338,002    Mero _____ Dec. 28, 1943